(12) United States Patent
Boudia et al.

(10) Patent No.: US 12,107,933 B1
(45) Date of Patent: Oct. 1, 2024

(54) CONTEXT BASED COMPUTING RESOURCE INTERMEDIATION ENGINE

(71) Applicant: Amadeus S.A.S., Biot (FR)

(72) Inventors: Mourad Boudia, Valbonne (FR); Nicolas Hauviller, Valbonne (FR); Rodolphe Texier, Vallauris (FR); Bilel Ben Romdhanne, Opio (FR); Fatih Donmez, Ankara (TR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/215,361

(22) Filed: Jun. 28, 2023

(51) Int. Cl.
*H04L 67/50* (2022.01)
*H04L 67/06* (2022.01)
*H04L 67/306* (2022.01)

(52) U.S. Cl.
CPC .......... *H04L 67/535* (2022.05); *H04L 67/306* (2013.01)

(58) Field of Classification Search
CPC ...... H04L 67/535; H04L 67/306; A63F 13/12; A63F 13/60; A63F 13/30; A63F 13/479
See application file for complete search history.

(56) References Cited

U.S. PATENT DOCUMENTS

| | | | |
|---|---|---|---|
| 11,785,299 B1* | 10/2023 | Wanjari | H04N 21/812 725/14 |
| 2003/0097428 A1 | 5/2003 | Afkhami et al. | |
| 2005/0027870 A1 | 2/2005 | Trebes, Jr. | |
| 2009/0063491 A1* | 3/2009 | Barclay | H04L 67/12 707/999.009 |
| 2010/0017283 A1 | 1/2010 | Hamilton, II et al. | |
| 2010/0100828 A1* | 4/2010 | Khandelwal | H04N 21/64322 715/757 |
| 2013/0036139 A1 | 2/2013 | Kung et al. | |
| 2013/0117351 A1 | 5/2013 | Zoheir et al. | |
| 2014/0289241 A1* | 9/2014 | Anderson | G06F 16/48 707/736 |
| 2016/0148192 A1 | 5/2016 | Storonsky | |
| 2016/0255327 A1 | 9/2016 | Cole et al. | |
| 2016/0316243 A1 | 10/2016 | Park et al. | |
| 2016/0379265 A1 | 12/2016 | Jagota et al. | |
| 2017/0064512 A1 | 3/2017 | Silverberg et al. | |
| 2017/0286539 A1 | 10/2017 | Smith et al. | |
| 2017/0310786 A1* | 10/2017 | Collier | H04L 65/80 |
| 2017/0316608 A1* | 11/2017 | Khalid | G06F 3/011 |
| 2018/0046944 A1 | 2/2018 | Barbera et al. | |
| 2018/0167483 A1 | 6/2018 | Cannon et al. | |
| 2018/0302489 A1 | 10/2018 | Harikumar et al. | |
| 2019/0215373 A1* | 7/2019 | Mathur | H04L 67/52 |

(Continued)

FOREIGN PATENT DOCUMENTS

| | | |
|---|---|---|
| KR | 102412142 B1 | 6/2022 |
| WO | WO-2021178630 A1 | 9/2021 |
| WO | WO-2022150486 A1 | 7/2022 |

OTHER PUBLICATIONS

Chen, Bohan, et al. "A cross-platform metaverse data management system." 2022 IEEE International Conference on Metrology for Extended Reality, Artificial Intelligence and Neural Engineering (MetroXRAINE). IEEE, 2022.

(Continued)

*Primary Examiner* — Alina A Boutah
(74) *Attorney, Agent, or Firm* — Perry + Currier Inc.

(57) ABSTRACT

The present specification provides, amongst other things, a computing resource Intermediation engine and method that can select and generate secondary content based on one or more demographic parameters, secondary content options and engagement ratings for those secondary content options.

20 Claims, 10 Drawing Sheets

(56) References Cited

U.S. PATENT DOCUMENTS

| | | | |
|---|---|---|---|
| 2019/0321725 | A1 | 10/2019 | Zimring et al. |
| 2019/0370492 | A1 | 12/2019 | Falchuk et al. |
| 2020/0230499 | A1 | 7/2020 | Buser et al. |
| 2021/0004733 | A1 | 1/2021 | Badua et al. |
| 2021/0303776 | A1 | 9/2021 | Morrow |
| 2021/0342754 | A1 | 11/2021 | Baalbergen |
| 2021/0383430 | A1* | 12/2021 | Chijimatsu .............. A63F 13/65 |
| 2022/0089237 | A1* | 3/2022 | Sverdlov ................ B25J 9/1697 |
| 2022/0132214 | A1 | 4/2022 | Felman |
| 2024/0144571 | A1* | 5/2024 | Zavesky ................. G06F 3/011 |
| 2024/0160272 | A1* | 5/2024 | Soryal ..................... G06F 3/011 |

OTHER PUBLICATIONS

Steam, "Steam Community Market." SteamCommunity.com, date unknown, Retrieved from the Internet on Jul. 12, 2023 from URL: steamcommunity.com/market/.

Steam, "Steam Community Market ?: Listings for Playerunknown Set." Steam. Community.com, date unknown, Retrieved from the Internet on Jul. 14, 2023 from URL: https://steamcommunity.com/market/listings/578080/PLAYERUNKNOWN%20SET. Accessed Jul. 14, 2023.

U.S. Appl. No. 18/134,663, Multi-Platform Content Normalization Engine, filed Apr. 14, 2023.

U.S. Appl. No. 18/134,765, Multi-Platform Virtual Retail Store Engine, filed Apr. 14, 2023.

U.S. Appl. No. 18/134,817, System and Method for Normalization of Electronic Message Content Representing Pricing Across Different Platforms, filed Apr. 14, 2023.

U.S. Appl. No. 18/134,859, Cross Platform Account Unification and Normalization, filed Apr. 14, 2023.

U.S. Appl. No. 18/120,085, Computing and Transportation Resource Optimization Engine, filed Mar. 10, 2023.

Berki, Borbála. "2d advertising in 3d virtual spaces." Acta Polytechnica Hungarica 15.3 (2018): 175-190.

* cited by examiner

US 12,107,933 B1

CONTEXT BASED COMPUTING RESOURCE INTERMEDIATION ENGINE

BACKGROUND

Communication activity on the modern Internet is distributed amongst many different server platforms offering content to millions of different client devices. Certain platforms offer similar types of content and thus compete for connections from the same client devices. Furthermore, many platforms may carry additional content intended to cause input from client devices that will divert traffic to another platform. However, the additional content may not trigger such input resulting in an overall wastage of computing resources by generating and transmitting additional content which is ignored.

SUMMARY

An aspect of the specification provides a computing resource intermediation engine comprising a processor and a memory for storing instructions executable on the processor; the processor configured to execute the following instructions stored in the memory:
  receive a demographic parameter record including at least one demographic parameter associated with an account identifier;
  determine an electronic interactive context within a set of primary content that is associated with the account identifier;
  receive a plurality of secondary content options;
  determine an engagement rating for said secondary content options based on said at least one demographic parameter and said electronic interactive context;
  select one of said secondary content options based on said engagement rating; and,
  generate the one of said secondary content options in association with said primary content within said interactive context.

The primary content can be generated on a metaverse platform.

The instructions can further comprise receiving input associated with said account identifier representing an interaction with said secondary content. The instructions can further comprise training a machine learning model based on said input and wherein said engagement rating is based at least in part on said machine learning model. The machine learning model is based on Random forest, Collaborative filtering or a neural network.

The secondary content options can have a format that is compatible with said interactive context.

The interactive context includes one or more of a type of platform generating said primary content, a geographic location of a user associated with the account identifier; hardware capabilities of a client device associated with the account identifier.

The instructions can further comprise dynamically updating the secondary content options based on said at least one demographic parameters, the interactive context, a geographic location and historic engagement ratings.

The secondary content can include a plurality of options offered by different travel-actors.

The engagement ratings can be based on historic engagement ratings of other account identifiers with similar demographic parameter records.

Methods, systems and computer readable media according to the foregoing are also contemplated in other aspects of this specification.

DETAILED DESCRIPTION

Figure 1:
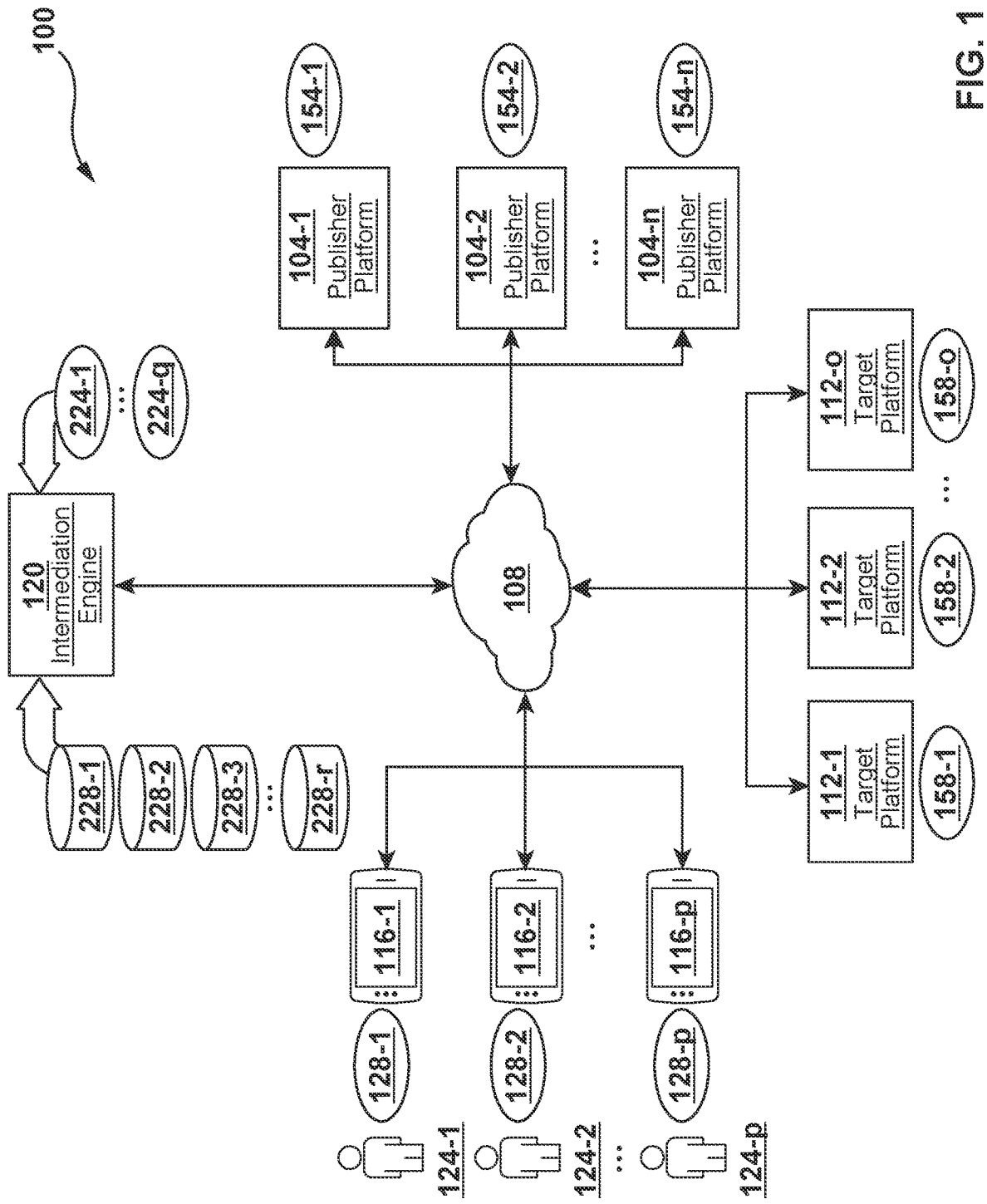
FIG. 1 is a schematic diagram of a system for computing resource optimization.

FIG. 1 shows a system for network traffic optimization indicated generally at 100. System 100 comprises a plurality of publisher platforms 104-1, 104-2 ... 104-n. (Collectively, platforms 104-1, 104-2 ... 104-n are referred to as platforms 104, and generically, as platform 104. This nomenclature is used elsewhere herein.) In system 100, platforms 104 connect to a network 108 such as the Internet. Network 108 interconnects publisher platforms 104 with: a) a plurality of target platforms 112; b) a plurality of client devices 116; and, d) an intermediation engine 120. As will be discussed further below, intermediation engine 120 performs a number of processing functions on system 100.

Platforms 104 can be based on any present or future electronic media servers that publish content for client devices 116. Client devices 116 can be any type of human-machine interface for interacting with platforms 104. For example, client devices 116 can include traditional laptop computers, desktop computers, mobile phones, tablet computers and any other device that can be used to receive content via one or more of the platforms 104 that complement the input and output hardware devices associated with a given client device 116. It is contemplated client devices 116 can include virtual or augmented reality gear complementary to virtual reality or augmented reality or "metaverse" environments that can be offered on publisher platforms 104. Client devices 116 can be operated by different users 124 that are associated with a respective identifier object 128 that uniquely identifies a given user 124 accessing a given client device 116 in system 100.

In a present example embodiment, platforms 104 can be based on media platforms that carry primary content for direct consumption by users 124 at client devices 116, while also generating secondary content in the form of advertising from services. (Herein, secondary content may sometimes be referred to as diversion content or diversionary content).

To elaborate, publisher platforms 104 can be based on social media ecosystems such as, TikTok™, Instagram™, Facebook™ or the like which generate primary content, (e.g. social media posts of users 124) and can embed their own secondary content (e.g. advertising of products or services available from target platforms 112) intended to divert a given client device 116 from the publisher platform 104 towards a specific target platform 112 that is associated with the secondary content. Publisher platforms 104 can also be based on ecosystems such as Google™, that include primary content delivered via YouTube™, Google Maps™, Google™ Search, Google News™, while also embedding secondary content intended to direct traffic to target platforms 112. Primary content can also be provided by publisher platforms 104 that offer web pages, social media, audio, video, movies, television, games, books, news, search results, and the like. Publisher platforms may also include metaverse environments such as the Sandbox™, Decentraland™ and Roblox™ that also deliver primary content. The nature of publisher platforms 104 is thus not particularly limited. Very generally, platforms 104 carry primary content for consumption by client devices 116 and secondary content for diverting traffic to target platforms 112.

In general, secondary content is typically generated in association with the primary content and, in a present embodiment, is typically advertising. Advertising can be generated and managed by advertising services such Google™ Ads, or Facebook™ Ads, Amadeus Digital Advertising, that can embed or otherwise associate advertising content into primary content provided by other websites or apps or other primary content from platforms 104. To reiterate, secondary content is any content that, when accessed or selected on a platform 104 by a given client device 116, can cause an interaction with a target platform 112.

According to a specific illustrative example, the present specification can have particular application to the travel industry and thus may (but need not) bias towards primary content of interest to users 124 who are known to be travelers, while secondary content may be more likely to include travel advertisements including that are intended to direct traffic to target platforms 112 that are travel actors and sell travel services.

Travel actors can broadly encompass different categories of all types of travel service offerings including transportation-actors; accommodation-actors and travel-destination actors. Transportation-actors can provide transportation services for users 124, such as airlines, rental car agencies, rail services, ferries, and bus lines. Accommodation-actors can provide lodging for users 124, such as hotels, vacation rentals, resorts and B&Bs ("Bed and Breakfasts"), including the lodging at the location where a user 124 arrives after receiving a transportation service. Travel-destination actors can include providers of activities at the location where a user 124 is lodging. Travel-destination actors can thus include, by way of non-limiting examples, restaurants, spas, concert venues, exhibition centers, summits, sporting event venues, fairs, conference venues, sporting arenas, museums, art galleries, tours and resort activity centers and the like.

According to the specific illustrative example discussed further below, target platforms 112 may focus on platforms 112 that generate content of interest to travelers. In certain presently preferred embodiments, platforms 112 reference transportation-actors and their sales workflows. However, platforms 112 may also include travel-destination target platforms 112. Furthermore, platforms 112 can also include a travel actor which has connectivity to partners, thereby enabling the sale of a variety and/or bundle of services, for example a transportation-actor which is able to sell its own flights together with services from accommodation-actors and travel-destination actors. Regardless, platforms 112 may include an e-commerce environment including a sales workflow or interactive sales function for client devices 116, representing a customer experience sales funnel, including experiences such as travel itinerary prediction and fulfillment as well as service searching, service browsing, adding a service to shopping cart, checkout, fare lock and temporary inventory holds to be provided for a fee, and payment processing.

As will be discussed in greater detail below, according to the certain embodiments, intermediation engine 120 is configured to provide secondary content that is interactive by suggesting a complete service, such as a travel itinerary, fully costed with payment processing, such that selection of the secondary content while generated on the publisher platform 104 results in a complete fulfillment of an electronic transaction that exchanges electronic payment messages representing financial fulfillment from a financial account associated with a user identifier object 128 with electronic itinerary fulfillment messages representing a complete travel itinerary (or other service) being associated with one or more user identifier objects 128 for use by associated user 124. This example may be referred to elsewhere as "travel itinerary fulfillment" or "complete travel itinerary fulfillment" or variants thereon according to context. When the embodiments herein are applied beyond travel itineraries, "travel itinerary fulfillment" may be seen more broadly as "service offering fulfillment", where service offerings may include other complete offerings such as dynamic packages of flights plus hotel, admission tickets to concerts or other travel-destination activities.

Accordingly, client devices 116 are based on any suitable client computing platform operated by users 124 that may have an interest in the content being provided on platforms 104 and the services being offered on target platforms 112. Each device 116 and its user 124 is thus associated with a user identifier object 128.

A person of skill in the art is to recognize that the form of an identifier object 128 is not particularly limited, and in a simple example embodiment, can be simply an alpha-numerical sequence that is entirely unique in relation to other identifier objects in system 100. Identifier objects can also be more complex as they may be combinations of account credentials (e.g. user name, password, Two-factor authentication token, etc.) that uniquely identify a given user 124. Identifier objects themselves may also be indexes that point to other identifier objects, such as accounts. The salient point is that they are uniquely identifiable within system 100 in association with what they represent.

Users 124 are typically individuals but may be corporate entities. Such users 124 interact, via devices 116, with both publisher platforms 104 as well as target platforms 112. Each consumer identifier object 128 can be used by other nodes in system 100, including publisher platforms 104, target platform 112 and intermediation engine 120 to track, amongst other things: a) traffic flows between a given client device 116 and various publisher platforms 104, including interactions (impressions as well as diversions) with a given advertising campaign; b) traffic flows between a given client device 116 and target platform 112; c) diversions of traffic originated by a given client device 116 from a given publisher platform 104 to target platform 112; and d) travel-itinerary fulfillments arising from selection of secondary content generated on one of the publisher platforms 104.

Figure 2:
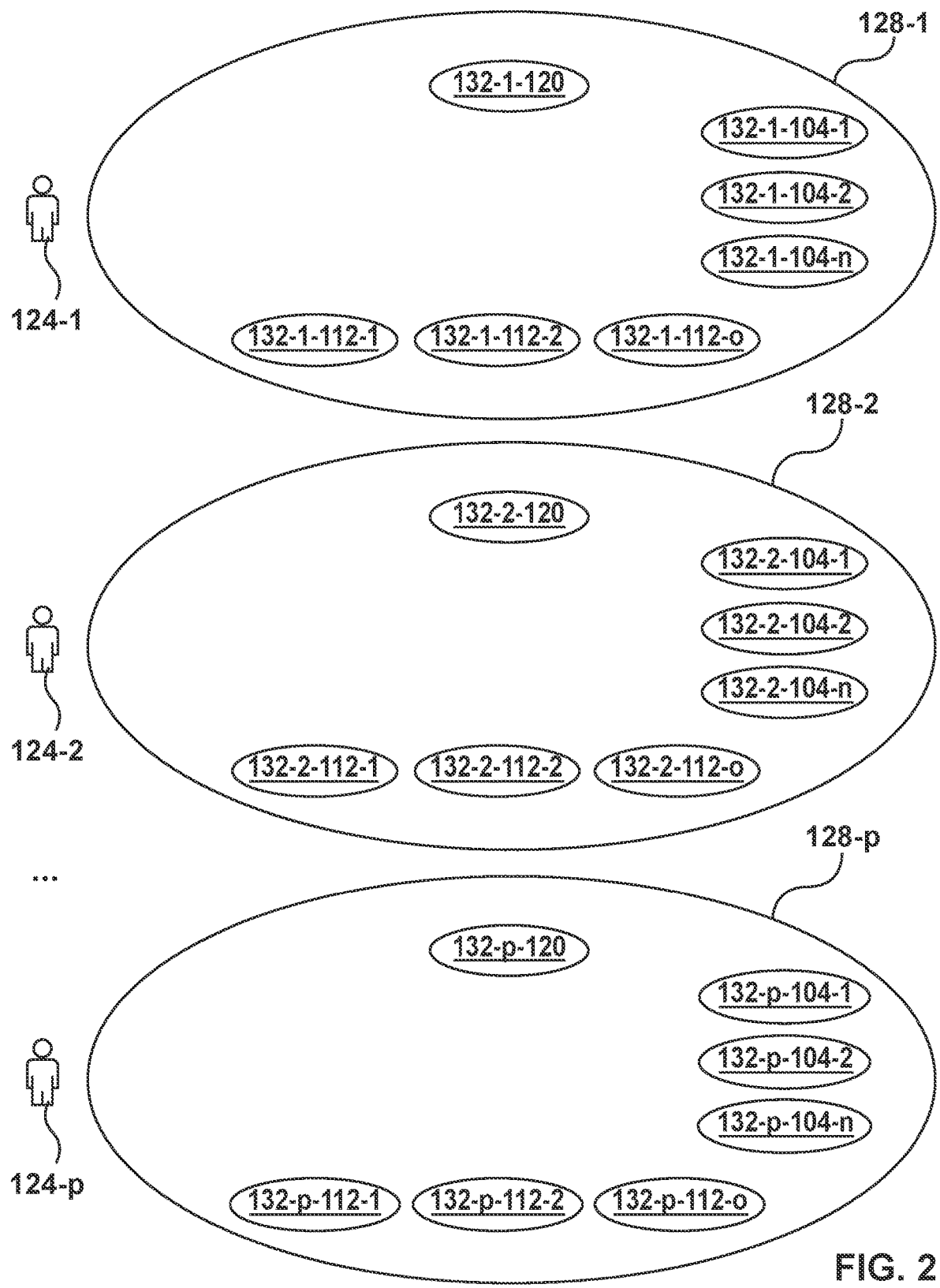
FIG. 2 shows an example structure of the identifier objects of FIG. 1.

FIG. 2 shows a non-limiting example of how consumer identifier objects 128 can be implemented as a plurality of consumer identifier sub-objects 132. Consumer identifier sub-objects 132 follow the nomenclature 132-X-Y where X corresponds to reference for a corresponding user 124 and Y corresponds to the reference for a corresponding node in system 100. (This nomenclature builds on the earlier-discussed nomenclature, since consumer identifier objects are referred to collectively as consumer identifier objects 128 and generically as consumer identifier object 128.) To elaborate, sub-objects 132-1-Y refer to user 124-1; sub-objects 132-2-Y refer to user 124-2; sub-objects 132-$p$-Y refer to user 124-$p$. Sub-object identifier 132-1-120 refers to the identifier for user 124-1 for intermediation engine 120. Sub-object identifier 132-1-104-1 refers to the identifier for user 124-1 for platform 104-1. Sub-object identifier 132-1-104-2 refers to the identifier for user 124-1 for platform 104-2. This nomenclature repeats for all identifier sub-objects 132 for each user 124, across each publisher platform 104 and each target platform 112.

Sub-objects 132 may be provided to anonymize, for privacy purposes, the specific identity (i.e. personally identifying information or PII) of the associated user 124. Some or all of those identifier sub-objects 132 may be anonymous or private to certain nodes in system 100 while being non-private to other nodes. For example, the operator of a target platform 112 may maintain an account (a form of consumer identifier sub-object 132-X-112) respective to each user 124-X that expressly identifies the user 124-X to handle delivery and payment processing of a given purchased good or service, such as a ticket or voucher for a service at a travel destination. At the same time, the operator of publisher platform 104 need not expressly identify a given user 124 in order to fulfill its advertising campaign functions, but can instead rely upon generic demographic information respective to the user 124-X that can be configured to permit targeting of an advertising campaign to a client device 116 while respecting the individual anonymity of the user 124-X of the client device 116. For simplification of explanation of the present embodiment, a single consumer identifier object 128 for each user 124 may be referenced in this specification, but a person skilled in the art will now appreciate such simplification and that contextually, a reference to an identifier object 128 for a given node in system 100 may involve the use of a consumer identifier sub-object 132 instead. By the same token, it is this contextual complexity that reveals one of the technical advantages of the present specification, which will become apparent with further reading, in that the disparate and often anonymous nature of identifier sub-objects 132 make load balancing of system 100 difficult, a difficulty that is mitigated by the present specification.

For simplicity in explanation, however, the following discussion may simply refer to consumer identifier object 128, but a person of skill in the art will recognize that consumer identifier object 128 may be implemented according to FIG. 2.

Referring again to FIG. 1, persons skilled in the art will recognize that there are many different types of interactions between client devices 116 accessing platforms 104, and that there are many different ways such interactions may lead to diversions that cause a given client device 116 to access target platform 112. The diversions may result in a fulfillment of a partial or complete travel itinerary suggested inside the secondary content on platform 104. In the case of a partial fulfillment, there can be repeated diversions from the same or different platforms 104 during different stages of a sales funnel experience of target platform 112 that can lead to a complete fulfillment. For example, in the case of partial fulfillments, client device 116-1 may access platform 104-1 and be exposed to an advertisement connected to an advertising campaign that causes client device 116-1 to direct traffic to an "offer for sale" web page on platform 112-1 that is offering a service, such as a complete travel itinerary. As part of the sales funnel experience, the client device 116-1 may send input that "adds" that service to a virtual "shopping cart" on target platform 112-1, but client device 116-1 may not, during the same session, send input that completes the "checkout" portion of the sales funnel experience. This incomplete sales funnel experience can then be logged within system 100 such that, during a subsequent access from client device 116-1 to platform 104-1, there may be exposure to another version of the secondary content in the form of an advertisement, that causes traffic from client device 116-1 to be directed to a "checkout" web page on target platform 112-1, urging completion of the "checkout" or purchasing portion of the sales funnel experience. To reiterate, this is but one example and with the benefit of further study of this specification a person of skill in the art will appreciate how the present teachings can be applied to these different types of interactions between client devices 116, publisher platforms 104 and the sales funnel experience on target platform 112.

It is contemplated that each publisher platform 104 has a publisher-reporting application 154 stored in non-volatile storage of the respective platform 104 and executable on its processor. The publisher-reporting application 154 can be accessed by intermediation engine 120 to track the number of impressions and/or diversions (if any) from the respective publisher platform 104 to target platform 112 that are associated with each consumer identifier object 128. The publisher-reporting application 154 can also be used to track queries or search for a given identifier 128 (or a given sub-object identifier 132-X-104) or the types of primary content being accessed on the platform 104. For example, repeated searches for a travel destination for an activity at a travel destination may be recorded in application 154 for later access by intermediation engine 120 and/or publisher platform 104 to generate primary content and/or secondary content relevant to that destination.

It is contemplated that target platforms 112 also include a target-reporting application 158 stored in non-volatile storage and executable on their processors. The target-reporting application 158 to track the various stages of the sales funnel experience for a user 124 via their respective identifier object 128. Target-reporting applications 158 can also maintain historical and future travel itineraries for each identifier 128.

Intermediation engine 120 is configured to store a plurality of applications 224 and datasets 228. As will be discussed further below, datasets 228 include a secondary content catalogue dataset 228-1, a probability dataset 228-2 and a demographic information dataset 228-3.

Intermediation engine 120 can be configured to obtain reports based on: a) the reports from each publisher-reporting application 154; in combination with b) reports from target-reporting application 158. Such reports thereby simplify the process of comparing the relative progress through the sales funnel experience, including actual sales conversions, associated with a given advertising campaign on each publisher platform 104 for a respective product. In turn, the normalized reports can be used to adjust advertising campaigns and/or control which platform servers 104 are provided with advertising campaigns, thereby reducing or eliminating wasted delivery (and associated waste of communication and other computing resources) of advertising campaigns from publisher platforms 104 that do not result in diversions to target platform112.

Intermediation engine 120 can also be configured to access publisher-reporting applications 154 to note, in the aggregate, top impressions of destinations by users 124.

Intermediation engine 120 can also be configured to access target-reporting applications 158 to update demographic information dataset 228-3 with account identifier objects 128 associated their respective users 124. Where management of personally identifiable information (PII) is included in system 100, then if permission is granted by a user 124 then intermediation engine 120 may specifically identify a given user 124; or if no permission is granted, then intermediation engine 120 may only access meta-results such as generalized demographic data for the user 124.

Figure 3:
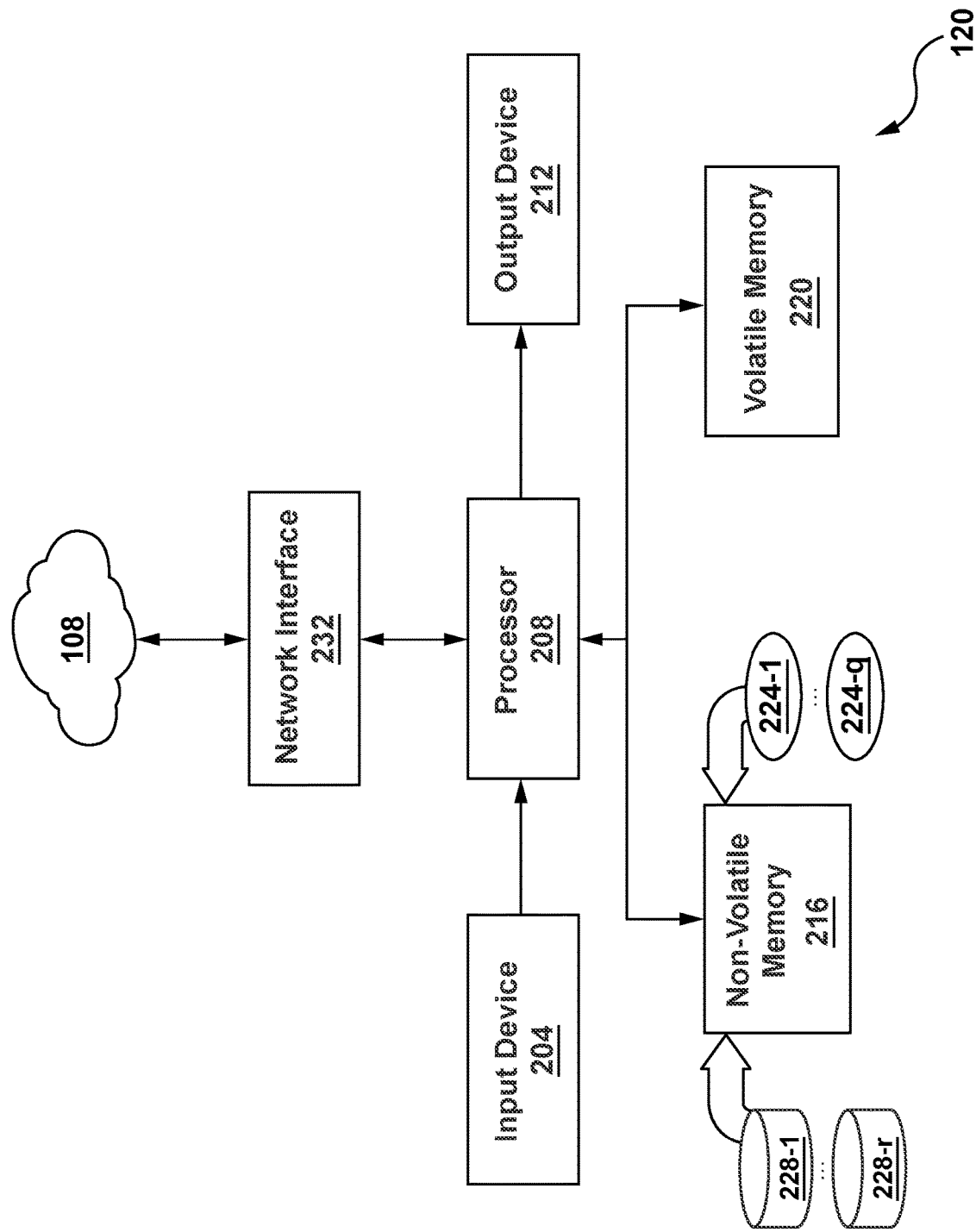
FIG. 3 is a block diagram of example internal components of the intermediation engine of FIG. 1.

Having described an overview of system 100, it is useful to comment on the hardware infrastructure of system 100. FIG. 3 shows a schematic diagram of a non-limiting example of internal components of intermediation engine 120.

In this example, intermediation engine 120 includes at least one input device 204. Input from device 204 is received at a processor 208 which in turn controls an output device 212. Input device 204 can be a traditional keyboard and/or mouse to provide physical input. Likewise output device 212 can be a display. In variants, additional and/or other input devices 204 or output devices 212 are contemplated or may be omitted altogether as the context requires.

Processor 208 may be implemented as a plurality of processors or one or more multi-core processors. The processor 208 may be configured to execute different programming instructions responsive to the input received via the one or more input devices 204 and to control one or more output devices 212 to generate output on those devices.

To fulfill its programming functions, the processor 208 is configured to communicate with one or more memory units, including non-volatile memory 216 and volatile memory 220. Non-volatile memory 216 can be based on any persistent memory technology, such as an Erasable Electronic Programmable Read Only Memory ("EEPROM"), flash memory, solid-state hard disk (SSD), other type of harddisk, or combinations of them. Non-volatile memory 216 may also be described as a non-transitory computer readable media. Also, more than one type of non-volatile memory 216 may be provided.

Volatile memory 220 is based on any random access memory (RAM) technology. For example, volatile memory 220 can be based on a Double Data Rate (DDR) Synchronous Dynamic Random-Access Memory (SDRAM). Other types of volatile memory 220 are contemplated.

Processor 208 also connects to network 108 via a network interface 232. Network interface 232 can also be used to connect another computing device that has an input and output device, thereby obviating the need for input device 204 and/or output device 212 altogether.

Programming instructions in the form of applications 224 are typically maintained, persistently, in non-volatile memory 216 and used by the processor 208 which reads from and writes to volatile memory 220 during the execution of applications 224. Various methods discussed herein can be coded as one or more applications 224. One or more tables or databases 228 are maintained in non-volatile memory 216 for use by applications 224.

The infrastructure of intermediation engine 120, or a variant thereon, can be used to implement any of the computing nodes in system 100, including platforms 104 and target platform 112. Furthermore, intermediation engine 120, platforms 104 and target platform 112 may also be implemented as virtual machines and/or with mirror images to provide load balancing. Functions of intermediation engine 120 may also be distributed amongst different target platforms 112 and/or platforms 114, thereby obviating the need for a central intermediation engine 120. By the same token, a plurality of intermediation engines 120 may be provided.

Furthermore, a person of skill in the art will recognize that the core elements of processor 208, input device 204, output device 212, non-volatile memory 216, volatile memory 220 and network interface 232, as described in relation to the server environment of intermediation engine 120, have analogues in the different form factors of client machines such as those that can be used to implement client devices 116. Again, client devices 116 can be based on computer workstations, laptop computers, tablet computers, mobile telephony devices or the like.

Figure 4:
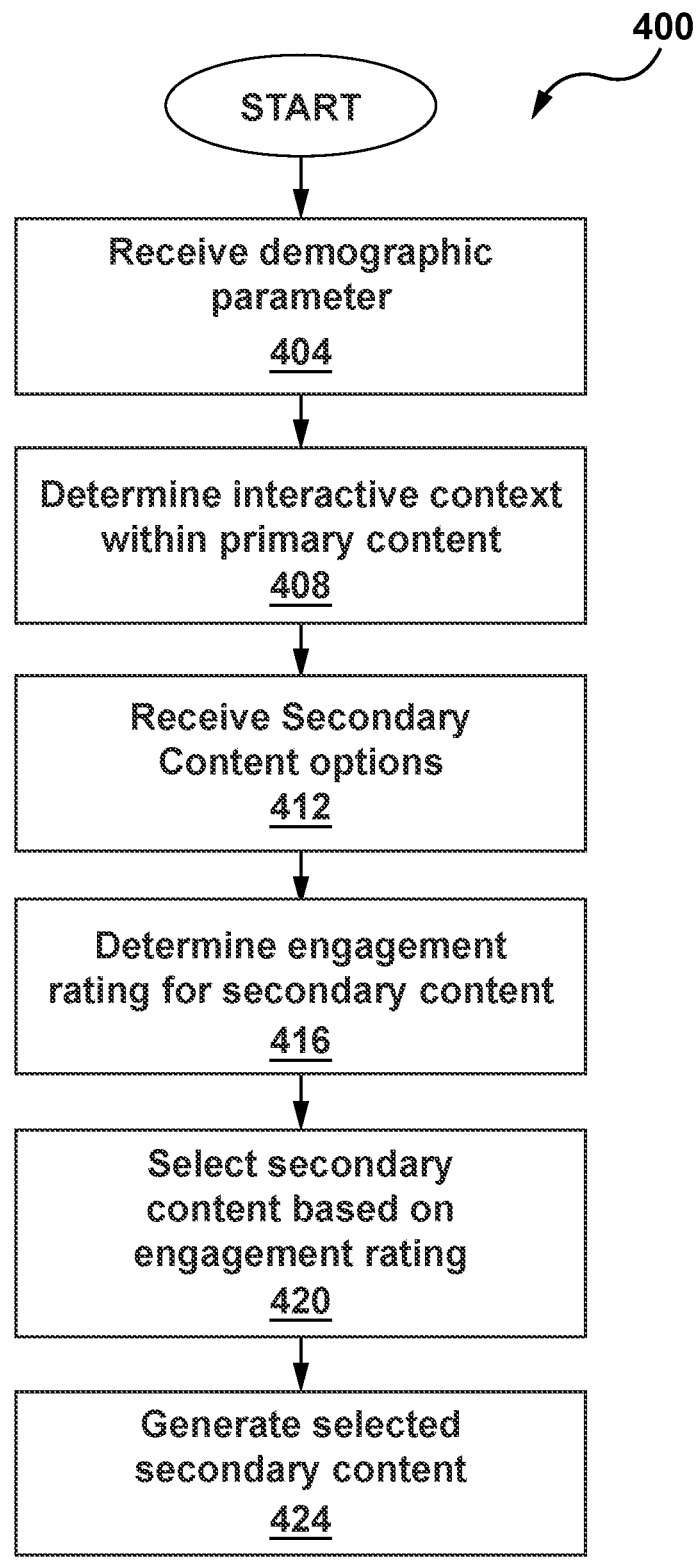
FIG. 4 shows a flowchart depicting a method for computing resource optimization.

FIG. 4 shows a flowchart depicting a method for network traffic optimization indicated generally at 400. Method 400 can be implemented on system 100. Persons skilled in the art may choose to implement method 400 on system 100 or variants thereon, or with certain blocks omitted, performed in parallel or in a different order than shown. Method 400 can thus also be varied. However, for purposes of explanation, method 400 will be described in relation to its performance on system 100 with a specific focus on treating method 400 as, for example, application 224-1 maintained within intermediation engine 120 and its interactions with the other nodes in system 100.

Figure 5:
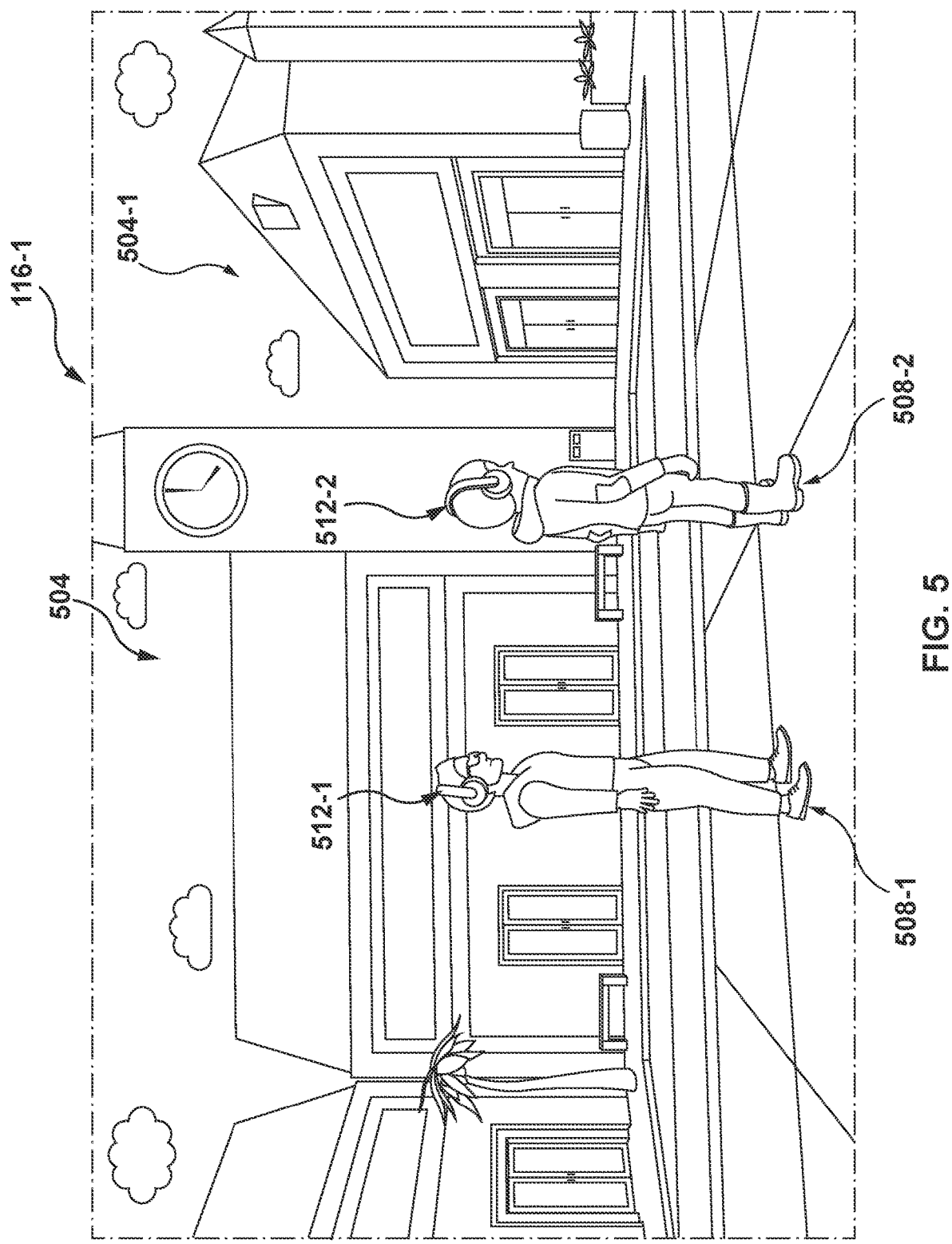
FIG. 5 shows an example scene of a virtual environment rendered on one of the platforms of the system of FIG. 1 to assist in explanation of the method of FIG. 4.

To help further explain method 400, a specific example illustration using system 100 is helpful, wherein it is assumed that user 124-1 is accessing publisher platform 104-1 via their device 116-1. As illustrated in FIG. 5, it will be further assumed that publisher platform 104-1 is hosting a virtual city environment 504 including a virtual city environment scene 504-1 that user 124-1 can navigate using device 116-1. The virtual city environment scene 504-1 can be part of a metaverse environment such as Roblox™, in which device 116-1 can also include a set of virtual reality gear for immersive experience inside virtual city environment 504. The virtual city environment 504-1 can also be part of a two-dimensional video game. To reiterate, however, FIG. 5 is a non-limiting illustrative example.

In FIG. 5, user 124-1 controls an avatar 508-1 that can navigate the virtual city environment 504 using input controls on device 116-1. Thus, in FIG. 5, it is further assumed that user 124-1 has authenticated on platform 104-1 using account identifier object 128-1 (and/or respective sub-account identifier object 132-1-104-1) and is now participating in the virtual world of the virtual city environment 504 hosted by platform 104-1. Continuing with the example, user 124-1 may also interact with other avatars 508, such as avatar 508-2. In our example, it will be assumed that avatar 508-2 is controlled by user 124-2 via device 116-2, and thus user 124-2 has also authenticated on platform 104-1 using account identifier object 128-2 (and/or respective sub-account identifier object 132-2-104-1) and is now participating in the virtual world of virtual city environment 504 or other environment hosted by platform 104-1. User 124-1 can thus see avatar 508-2 on device 116-1, but cannot control it, but may be able to interact with user 124-2 over platform 104-1 via their respective avatars 508. Such interaction can include, by way of non-limiting examples, user 124-1 and user 124-2 engaging in voice or text communication with each other; playing a game against each other inside virtual city environment 504 and/or being virtual companions with each other while exploring virtual city environment 504.

Using this example, various blocks in method 400 will now be explained. Block 404 comprises receiving a demographic parameter record. In system 100, at block 404, processor 208 of intermediation engine 120 accesses the contents of demographic information dataset 228-3 in nonvolatile memory 216.

The demographic parameter record comprises one or more demographic parameters typically associated with an account identifier, such as account identifier object 128 and/or an account identifier sub-object 132-1-120. A plurality of such demographic information records can be stored for each user 124. According to the example in FIG. 5, Table I shows an example set of fields and contents of a demographic parameter record for user 124-1 that can be stored in dataset 228-3 and retrieved at block 404.

TABLE I

Demographic information record for User 124-1

| Field | Contents |
| --- | --- |
| Age | 36 |
| Origin Country | USA |
| Language | English |
| Interests | Rock Concerts; Rock Music; European Travel |
| Hobbies | Hiking; Extreme Sports; |
| Historical Ads proposed | XYZ Fashion House |
| Historical Ads clicked | ABC Indoor Swimming Pool |
| Purchases | Bathing suit; Children's bathing suit |
| Travel Bookings | Rome to Barcelona (past) |
| Published Posts | "Why I climbed Mt. Kilimanjaro" |
| Published Comments | "I would really like to Hike the Sahara sometime" |
| Device hardware (Device 116-1) | VR Headset connectable to Mobile Telephone |

It is to be reiterated that TABLE I is merely an example, and that different, fewer or a greater number of fields for demographic parameters, and that records similar in format to TABLE I can be maintained in dataset 228-3 for all users 124.

Block 408 comprises determining an interactive context within a set of primary content. The primary content generally refers to the environment that a client device 116 is engaged with on a publisher platform 104. As noted such an environment can be a game, website, virtual world, social media platform or any other experience hosted for access by a device 116. The interactive context is the specific state of the user's engagement with the primary content. The determining at block 408 can be performed by intermediation engine 120 monitoring the interactions between each device 116 and each platform 104.

Continuing with our illustrative example, the primary content is the virtual city environment scene 504-1, and the interactive context is avatar 508-1 virtually walking through scene 504-1. Also of note is that avatar 508-1 is wearing virtual headphones 512-1. Virtual headphones 512-1 can be a simulation of physical headphones or speakers connected as an output device to device 116-1, from which an audio signal can be heard by user 124-1. The fact of the "wearing" of virtual headphones 512-1 by avatar 508-1 is also part of the interactive context. Furthermore, whatever audio file, likely music, is being "played" over the virtual headphones 512-1 is also part of the interactive context. Furthermore, if avatar 508-1 were to "remove" the virtual headphones 512-1, then the actual audio file being played, "in the real world", to the user 124-1 would change from whatever music was being played to the sounds of street traffic of the virtual city environment scene 504-1. All of these factors contribute to the interactive context in which avatar 504-1 is engaging with the primary content.

Other factors that can be considered part of interactive context include whatever activity the avatar 508 is doing, such as virtually walking, running, climbing, fighting, flying, resting, etc.; whatever the avatar 508 is "seeing" or "hearing" or "touching" in the virtual environment; whatever the avatar 508 is virtually wearing; which other avatars 508 or non-player characters the avatar 508 is interacting with, and what is the form of such interaction. In general, interactive context includes anything that represents virtual input within the virtual environment to the virtual five senses of the avatar 508, as well as anything that represents virtual output from the avatar 508 to the virtual environment, such as any gestures, movements, sounds, talking being performed by the avatar 508.

(While these examples relate to metaverse or video game environments, a person of skill in the art will also appreciate that examples of primary content and interactive contexts also arise within traditional web browsing and other Internet-based experiences, e.g. a person reading a travel blog website is consuming primary content in the form of the travel blog; and the interactive context is reading the travel blog. The interactive context may also include the speed with which the travel blog is being read, which passages receive more focus than others, which images are saved, whether the blog is being forwarded, etc.)

Continuing with our illustrative example in FIG. 5, assume that avatar 508-1 (and therefore user 124-1) is "Listening to Rock Music".

(At this point it can be noted that "Rock Music" is also noted as an Interest within the demographic information record of Table I for user 124-1. However, if "Rock Music" was not noted as an interest, the fact of the interactive context including "Listening to Rock Music" could be used to update Table I to include that interest. It will now be apparent that interactive contexts can be used to update demographic information records in accordance with certain implementations of the present specification.)

Accordingly, in an example fulfillment of block 408, it can be determined at block 408, by intermediation server 120, that the interactive context is "Listening to Rock Music". Note that other interactive contexts can also be determined at block 408, but "Listening to Rock Music" will be used as part of our illustrative example performance of method 400.

Block 412 comprises receiving a plurality of secondary content options. In system 100, at block 412, processor 208 of intermediation engine 120 accesses the contents of secondary content catalogue dataset 228-1 in nonvolatile memory 216. According to the example in FIG. 5, Table I shows an example set of fields and contents of a secondary content catalogue that can be stored in dataset 228-1 and retrieved at block 412.

TABLE II

Secondary Content Catalogue

| Target Platform | Secondary Content Format | Secondary Content |
|---|---|---|
| Target platform 112-1 | Virtual Stadium | Virtual Rock Concert by "RRR Rock Stars" |
| Target platform 112-2 | Virtual Poster | Flights to Barcelona by "XYZ Airlines" |
| Target platform 112-3 | Virtual Billboard | One day excursion: Hike in the Desert by "HIP Excursion" |
| Target platform 112-4 | Virtual Poster | 25% Discount Coupon for "ABC Indoor Swimming Pool" |
| Target platform 112-5 | Virtual Radio Advertisement | Mountain climbing excursion by "EVER-REST Vacations" |
| Target platform 112-6 | Virtual Storefront | 15% Coupon for "XYZ Fashion House" |

According to Table II, each target platform 112-1 may have one or more (or zero) items of secondary content that can be offered on the environment of any given platform 104.

The format of the secondary content is virtual, such as a type of object that may be present within the virtual environment, such as a virtual posters, billboards, radio advertisements or store fronts. Other example formats of secondary content will occur to those of skill in the art.

The secondary content itself can be hosted entirely within the given platform 104, such as a virtual musical concert. The secondary content can encourage an interaction with the secondary content that can cause a diversion to the respective target platform 112 from the publisher platform 104. The secondary content can encourage an interaction with the secondary content that results in an incentive to connect to the target platform 112 at a later time. Other types of secondary content will occur to those skilled in the art.

Block 416 comprises determining an engagement rating for the secondary content from block 412. The engagement rating can be based on one or more of the demographic parameters from block 404, the interactive context from block 408, and the secondary content options from block 412. The engagement rating can be based on a machine learning model continuously improves based on feedback from users 124, as will be discussed further below.

Continuing with our example, the engagement rating considers the demographic information of Table I, the interactive context of "Listening to Rock Music", which are applied against the entries in Table II to develop an engagement rating that considers the likelihood that a particular user will interact with a given set of secondary content. Table III shows example output of Block 416 based on the foregoing.

TABLE III

Engagement Ratings

| Target Platform | Secondary Content Format | Secondary Content | Relevant Demographic Information | Interactive Context | Engagement Rating |
|---|---|---|---|---|---|
| Target platform 112-1 | Virtual Radio Advertisement | Virtual Rock Concert in Virtual Stadium by "RRR Rock Stars" | Rock Music, Rock Concerts | "Listening to Rock Music" within virtual city environment | 90% |
| Target platform 112-2 | Virtual Poster | Flights to Barcelona by "XYZ Airlines" | European Travel | "Listening to Rock Music" within virtual city environment | 70% |
| Target platform 112-3 | Virtual Billboard | One day excursion: Hike in the Desert by "HIP Excursion" | Hiking; Extreme Sports; "I would really like to hike the Sahara sometime" | "Listening to Rock Music" within virtual city environment | 70% |
| Target platform 112-4 | Virtual Poster | 25% Discount Coupon for "ABC Indoor Swimming Pool" | Purchased Bathing Suit and Children's Bathing Suit | "Listening to Rock Music" within virtual city environment | 40% |
| Target platform 112-5 | Virtual Radio Advertisement | Mountain climbing excursion by "EVER-REST Vacations" | Extreme Sports; Blog Post "Why I climbed Mount Kilimanjaro | "Listening to Rock Music" within virtual city environment | 30% |
| Target platform 112-6 | Virtual Storefront | 15% Coupon for "XYZ Fashion House" | None | "Listening to Rock Music" within virtual city environment | 10% |
| Target platform 112-7 | Virtual Poster | 20% Coupon for "JHK Lipstick" | None | "Listening to Rock Music" within virtual city environment | 5% |

According to Table III, the Virtual Rock Concert by "RRR Rock Stars" offered by target platform 112-1 has the highest percentage engagement rating at 90%, due to the fact that the interactive context includes "Listening to Rock Music" which intersects with the known interests of "Rock Concerts" and "Rock Music". "Flights to Barcelona by "XYZ Airlines"" has a 70% engagement score because of the alignment of interest from the demographic score, but is not higher because the interactive context does not suggest a likelihood of user 124-1 being interested in that activity, at least compared to attending a "Rock Concert"; For similar reasons, "Mountain climbing excursion by "EVER-REST Vacations"; "One day excursion: Hike in the Desert by "HIP Excursion" and "25% Discount Coupon for "ABC Indoor Swimming Pool"" have lower engagement scores due to their intersection with certain demographic information, but their lack of intersection with the interactive context. "15% Coupon for "XYZ Fashion House"" is assigned a 10% score, and "20% Coupon for "JHK Lipstick"" because there is no clear intersection between demographic information or interactive context.

Block 420 comprises selecting the secondary content based on the engagement rating. Block 420 can be implemented various ways. For example, a minimum threshold rating can be required before the secondary content will be selected. One or more items of secondary content may be selected based on the minimum threshold rating. Or only a single item of secondary content may be selected based on the threshold rating, such as selecting one or more of the secondary content from block 416 for generation within the environment scene being accessed by the relevant client device 116.

In the specific example of FIG. 5, it will be assumed that secondary content with an engagement rating of greater than fifty percent will be selected at block 420. Thus, the top three rows of Table III will be selected, "Virtual Rock Concert in Virtual Stadium by "RRR Rock Stars""; "Flights to Barcelona by "XYZ Airlines""; "One day excursion: Hike in the Desert by "HIP Excursion"".

Figure 6:
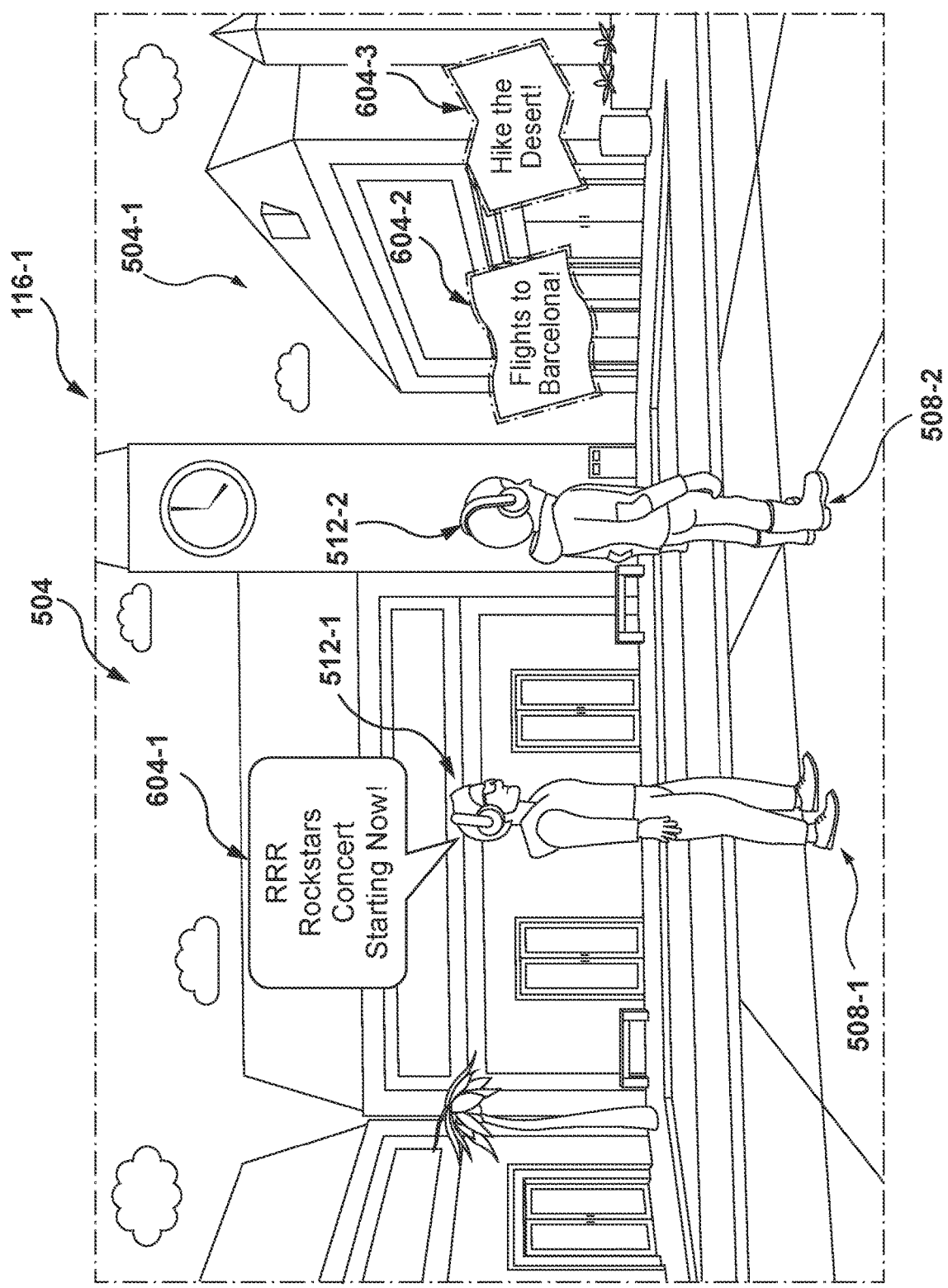
FIG. 6 shows an example scene of a virtual environment rendered on one of the platforms of the system of FIG. 1 to assist in explanation of the method of FIG. 4.

Block 424 comprises generating the selected secondary content. Example performance of block 424 is shown in FIG. 6, where scene 504-1 is shown again, but with secondary content 604 added. Secondary content 604-1 corresponds to the first row of Table III, in the form of a virtual radio announcement advertising RRR Rockstars having a virtual concert within virtual city environment 504. Secondary content 604-2 corresponds to the second row of Table III, in the form of a virtual billboard advertising flights to Barcelona. Secondary content 604-3 corresponds to the third row of Table III, in the form of a virtual billboard advertising hiking excursions in the desert.

Figure 7:
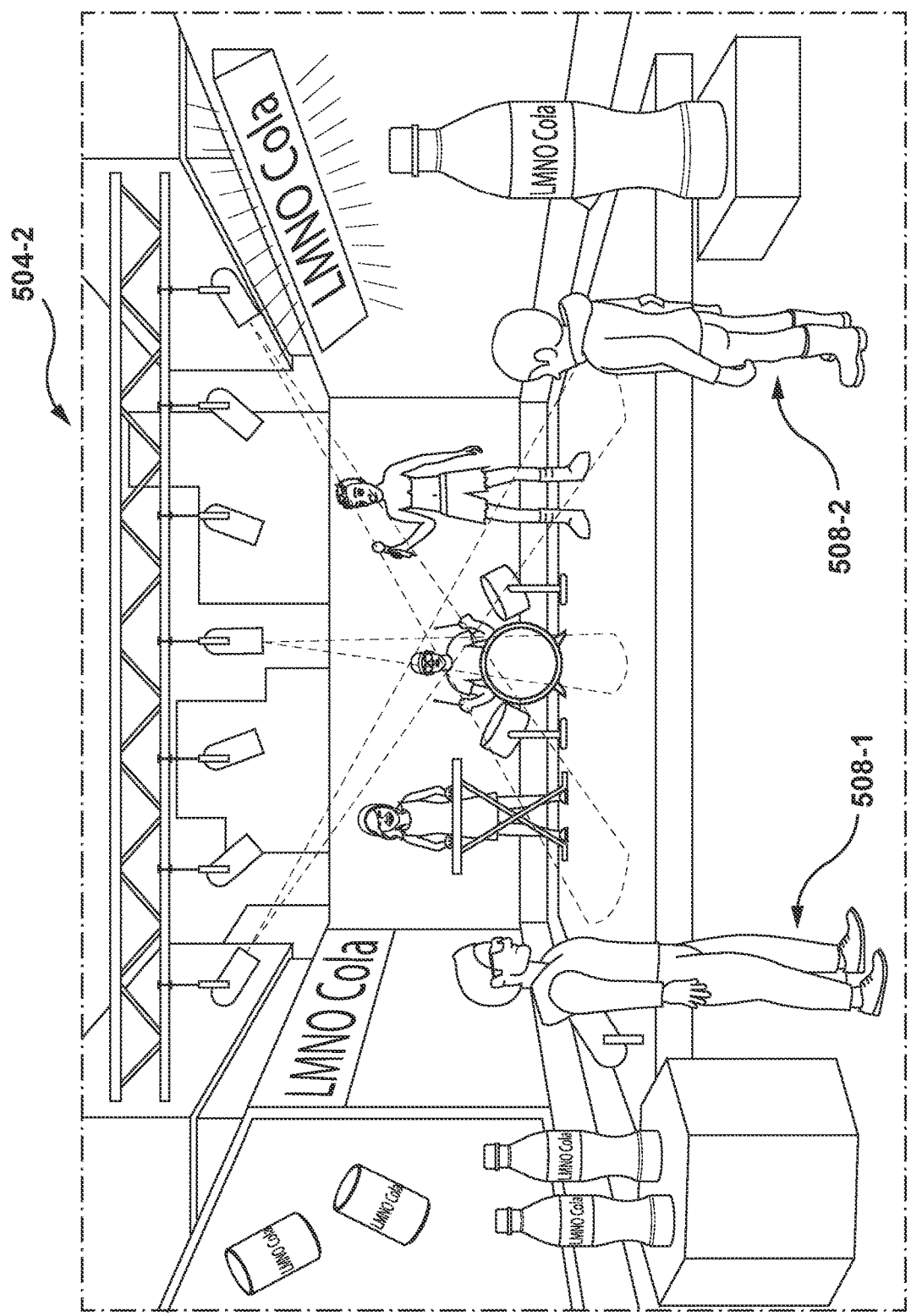
FIG. 7 shows an example scene of a virtual environment rendered on one of the platforms of the system of FIG. 1 to assist in explanation of the method of FIG. 4.
Figure 8:
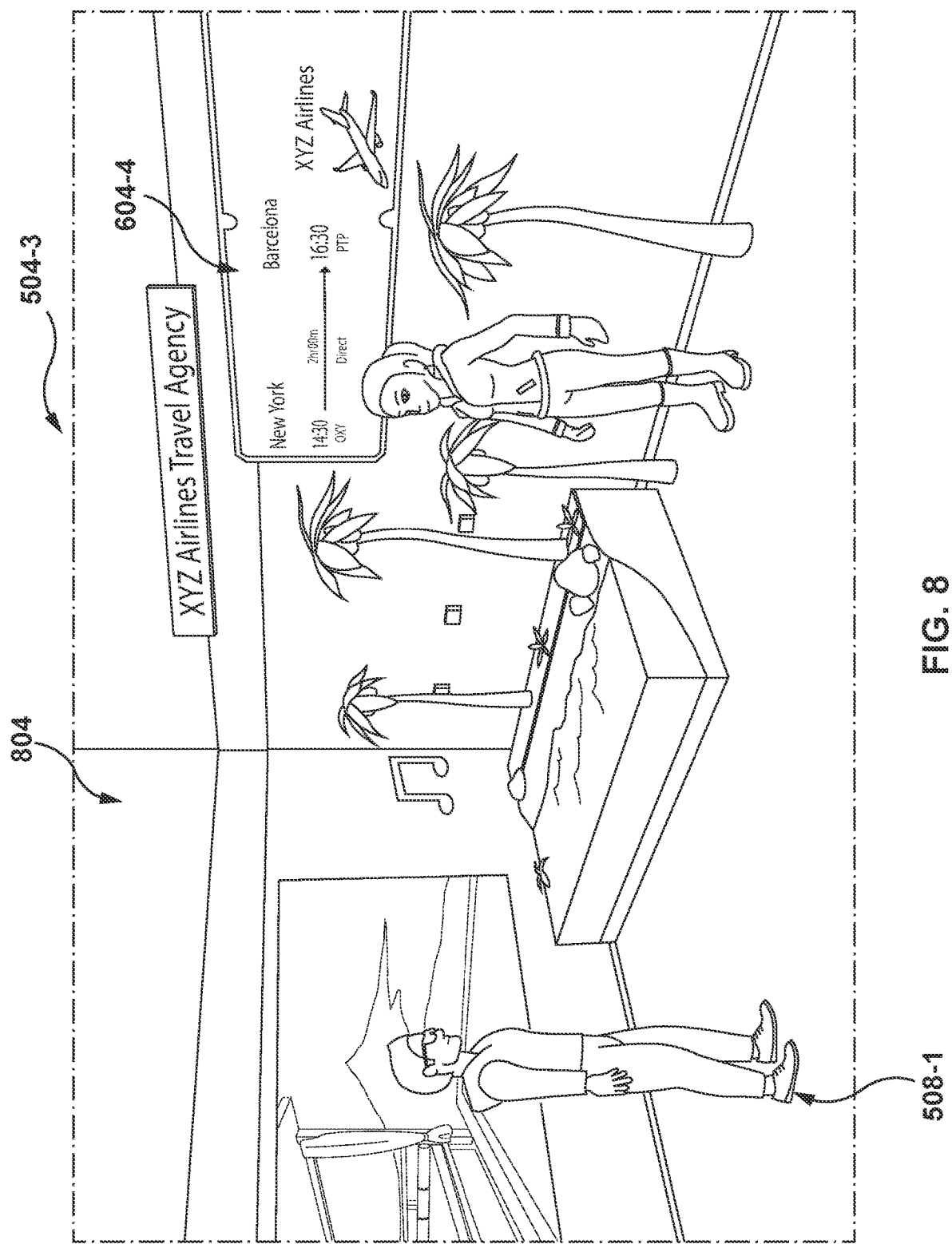
FIG. 8 shows an example scene of a virtual environment rendered on one of the platforms of the system of FIG. 1 to assist in explanation of the method of FIG. 4.
Figure 9:
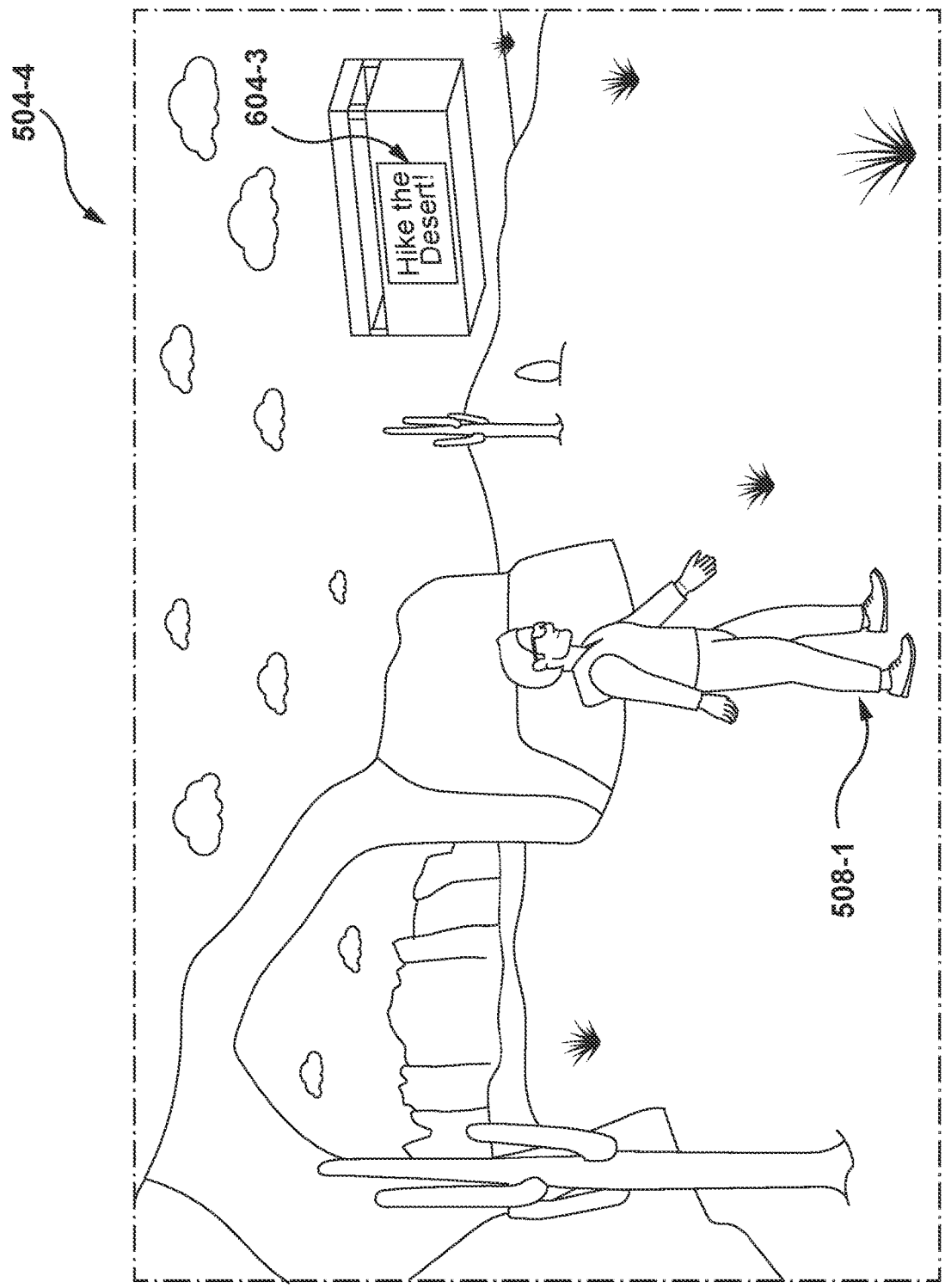
FIG. 9 shows an example scene of a virtual environment rendered on one of the platforms of the system of FIG. 1 to assist in explanation of the method of FIG. 4.
Figure 10:
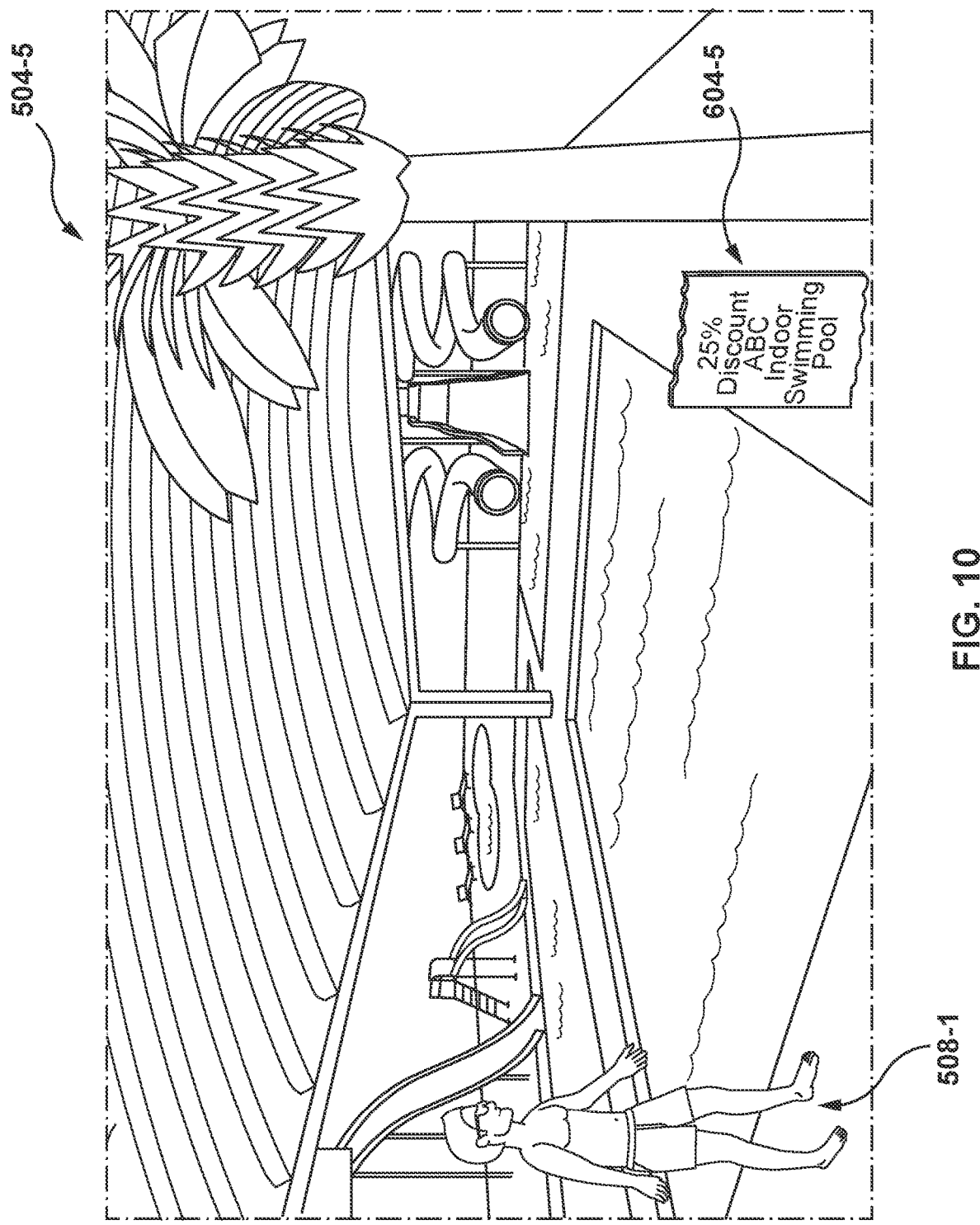
FIG. 10 shows an example scene of a virtual environment rendered on one of the platforms of the system of FIG. 1 to assist in explanation of the method of FIG. 4.

Having generated the secondary content options within the scene 504-1, depending on whether, and which, secondary content 604 is selected by user 124-1 via their avatar 508-1, then a secondary content experience can be generated. For example, referring now to FIG. 7, if user 124-1 selects the RRR Rockstars concert, then user 124-1 can be provided virtual admission to the RRR Rockstars concert generated at scene 504-2 within environment 504. Alternatively, if user 124-1 selected the Flights to Barcelona advertisement, then device 116-1 may be temporarily diverted to target platform 112-2 to complete a transaction to explore and/or purchase a flight to Barcelona or other travel destination. Alternatively, avatar 508-1 could be transported to a virtual travel agency 804 as shown in FIG. 8, to discuss flight options.

Note that in another example performance of method 400, assume that avatar 508-1 "walks" into the virtual travel agency 804. In this example, the interactive context of block 408 will note that avatar 508-1 is located within the travel agency, and thus the engagement rating at block 416 for "Flights to Barcelona by XYZ airlines" from the second row of Table II will be virtually one hundred percent, and thus secondary content 604-4 in FIG. 8 can be generated in the form of a virtual dynamic poster in the form of a flight card showing flight options from New York to Barcelona. User 124-1 via avatar 508-1 can then either complete the flight booking inside the virtual travel agency 804 or be diverted to target platform 112-2 to complete the transaction.

In another example performance of method 400 assume that avatar 508-1 is navigating a virtual desert scene 504-4. Virtual desert scene 504-4 can be part of a video game or other simulation. During performance of method 400, the interactive context of block 408 will be "Walking through a desert" which corresponds well with the hobby "Hiking" and the Posted comment "I would really like to Hike the Sahara some time" from Table I, and the "Hike the Desert" secondary content inventory from the third row of Table II. Block 416 will thus assign a near 100% engagement rating for "Hike the Desert" leading to the generation of secondary content 604-3 inside scene 504-4.

In another example performance of method 400 assume that avatar 508-1 is navigating a virtual indoor waterpark scene 504-5, which can be part of a video game or other simulation. During performance of method 400, the interactive context of block 408 will be visiting the virtual waterpark, which corresponds well with the previous purchase of a bathing suit and children's bathing suit, and the previous selection of ABC Waterpark in a prior advertisement from Table I, and the "Indoor Swimming Pool" secondary content inventory from the third row of Table II. Block 416 will thus assign a near 100% engagement rating for the indoor swimming pool coupon, leading to the generation of secondary content 604-5 inside scene 504-5.

Note that one or more of the applications 224 may include machine learning and/or deep-learning based algorithms and/or neural networks, and the like, which are trained to improve the determination of engagement ratings discussed in relation to block 416. (Hereafter machine learning applications 224). Furthermore, in these examples, the machine learning applications 224 may be operated by the controller 218 in a training mode to train the machine learning and/or deep-learning based algorithms and/or neural networks of the machine learning applications 224 in accordance with the teachings herein.

The one or more machine-learning algorithms and/or deep learning algorithms and/or neural networks of the machine learning applications 224 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. in public safety environments such as law enforcement. To be clear, any suitable machine-learning algorithm and/or deep learning algorithm and/or neural network is within the scope of present examples.

The machine learning model training can be based on using the demographic parameters from block 404 combined with the different interactive contexts determined at block 408 and compared with the actual interactions between the users 124 and the secondary content generated at block 424. According to this feedback loop, the engagement ratings at block 416 can be determined with the assistance of the trained machine learning model. For example, a lower rate of engagement with certain secondary content within certain interactive contexts as opposed to a higher rate of engagement with certain secondary content in other interactive contexts may be used to train the machine learning model to favor generation of the secondary content within the interactive contexts that have higher rates of engagement. The machine learning model can become extremely sophisticated as these variables (demographic data, interactive contexts) result in different likelihood-of-engagement ratings that lead to different generation of secondary content. As the actual engagements are monitored, the algorithm to determine the likelihood-of-engagement at block 416 can be adjusted to respond to the machine learning dataset and thereby increase likelihoods of engagement with the secondary content.

In view of the above it will now be apparent that variants, combinations, and subsets of the foregoing embodiments are contemplated.

A person skilled in the art will now appreciate that the teachings herein can improve the technological efficiency and computational and communication resource utilization across system 100 by curating secondary content according to demographic information, interactive contexts and actual interactions with generated secondary content. Computing resources are more efficiently deployed if the generation of secondary content leads to actual interactions as opposed to secondary content that remains without interaction which leads to wasted computing, memory and network resources as that secondary content never leads to interaction.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing resource intermediation engine comprising a processor and a memory for storing instructions executable on the processor;
the processor configured to execute the following instructions stored in the memory:
receive a demographic parameter record including at least one demographic parameter associated with an account identifier;
determine an electronic interactive context within a set of primary content provided by a publisher platform, the electronic interactive context being associated with the account identifier;
receive a plurality of secondary content options associated with target platforms, each of the secondary content options configured to divert traffic from the publisher platform to one of the target platforms;
determine an engagement rating for said secondary content options based on said at least one demographic parameter and said electronic interactive context;
select one of said secondary content options based on said engagement rating; and,
generate the one of said secondary content options in association with said primary content within said interactive context.

2. The intermediation engine of claim 1 wherein the primary content is generated on a metaverse platform.

3. The intermediation engine of claim 1 wherein the instructions further comprise receiving input associated with said account identifier representing an interaction with said secondary content.

4. The intermediation engine of claim 3 wherein the instructions further comprise training a machine learning model based on said input and wherein said engagement rating is based at least in part on said machine learning model.

5. The intermediation engine of claim 4 wherein the machine learning model is based on Random forest, Collaborative filtering or a neural network.

6. The intermediation engine of claim 1 wherein the secondary content options have a format that is compatible with said interactive context.

7. The intermediation engine of claim 1 wherein the interactive context includes one or more of a type of platform generating said primary content, a geographic location of a user associated with the account identifier; hardware capabilities of a client device associated with the account identifier.

8. The intermediation engine of claim 1 further comprising the instruction of dynamically updating the secondary content options based on the at least one demographic parameter, the interactive context, a geographic location and historic engagement ratings.

9. The intermediation engine of claim 1 where the secondary content includes a plurality of options offered by different travel-actors.

10. The intermediation engine of claim 1 wherein the engagement ratings are further based on historic engagement ratings of other account identifiers with similar demographic parameter records.

11. A method for computing resource intermediation comprising:
receiving a demographic parameter record including at least one demographic parameter associated with an account identifier;
determining an electronic interactive context within a set of primary content provided by a publisher platform, the electronic interactive context being that is associated with the account identifier;
receiving a plurality of secondary content options associated with target platforms, each of the secondary content options configured to divert traffic from the publisher platform to one of the target platforms;
determining an engagement rating for said secondary content options based on said at least one demographic parameter and said electronic interactive context;
selecting one of said secondary content options based on said engagement rating; and,
generating the one of said secondary content options in association with said primary content within said interactive context.

12. The method of claim 11 wherein the primary content is generated on a metaverse platform.

13. The method of claim 11 further comprising receiving input associated with said account identifier representing an interaction with said secondary content.

14. The method of claim 11 further comprising training a machine learning model based on said input and wherein said engagement rating is based at least in part on said machine learning model.

15. The method of claim 14 wherein the machine learning model is based on Random forest, Collaborative filtering or a neural network.

16. The method of claim 11 wherein the secondary content options have a format that is compatible with said interactive context.

17. The method of claim 11 wherein the interactive context includes one or more of a type of platform generating said primary content, a geographic location of a user associated with the account identifier; hardware capabilities of a client device associated with the account identifier.

18. The method of claim 11 further comprising dynamically updating the secondary content options based on said at least one demographic parameter, the interactive context, a geographic location and historic engagement ratings.

19. The method of claim 11 where the secondary content includes a plurality of options offered by different travel-actors.

20. The method of claim 11 wherein the engagement ratings are further based on historic engagement ratings of other account identifiers with similar demographic parameter records.

* * * * *